(12) United States Patent
Ee et al.

(10) Patent No.: US 8,446,695 B1
(45) Date of Patent: May 21, 2013

(54) SUSPENSION RING GIMBAL HAVING FORWARDLY EXTENDING TORSION ARMS

(75) Inventors: Kuen Chee Ee, Chino, CA (US); Peter Hahn, Wildomar, CA (US); Brett Holaway, Wangnol (TH)

(73) Assignee: Magnecomp Corporation, Murrieta, CA (US)

( * ) Notice: Subject to any disclaimer, the term of this patent is extended or adjusted under 35 U.S.C. 154(b) by 202 days.

(21) Appl. No.: 12/858,643

(22) Filed: Sep. 13, 2010

(51) Int. Cl.
*G11B 5/48* (2006.01)

(52) U.S. Cl.
USPC .................................. 360/245.3; 360/245.9

(58) Field of Classification Search
USPC .................................. 360/245–245.7, 245.9
See application file for complete search history.

(56) References Cited

U.S. PATENT DOCUMENTS

| | | | | |
|---|---|---|---|---|
| 5,452,158 A * | 9/1995 | Harrison et al. | ............ | 360/245.3 |
| 5,491,597 A * | 2/1996 | Bennin et al. | .............. | 360/245.9 |
| 5,883,759 A * | 3/1999 | Schulz | ........................ | 360/245.9 |
| 5,933,293 A * | 8/1999 | Bennin | ...................... | 360/245.9 |
| 6,147,840 A | 11/2000 | Khan | | |
| 6,515,832 B1 * | 2/2003 | Girard | ......................... | 360/245.3 |
| 6,980,400 B2 | 12/2005 | Girard | | |
| 7,054,103 B2 * | 5/2006 | Tadepalli et al. | .......... | 360/97.14 |
| 7,317,595 B2 | 1/2008 | Tsuchida et al. | | |
| 7,386,932 B2 * | 6/2008 | Girard | ......................... | 29/603.06 |
| 7,450,345 B2 | 11/2008 | Tokuyama et al. | | |
| 7,545,600 B2 * | 6/2009 | Sorrell et al. | ................ | 360/97.2 |
| 8,027,128 B2 * | 9/2011 | Muraki et al. | ............. | 360/245.3 |
| 8,130,470 B2 * | 3/2012 | Muraki et al. | ............. | 360/245.3 |
| 8,208,224 B1 * | 6/2012 | Teo et al. | .................... | 360/245.3 |
| 2007/0086115 A1 | 4/2007 | Harris et al. | | |
| 2007/0115591 A1 | 5/2007 | Yao et al. | | |
| 2007/0230058 A1 | 10/2007 | Muraki et al. | | |
| 2009/0268347 A1 | 10/2009 | Muraki et al. | | |

* cited by examiner

*Primary Examiner* — Brian Miller
(74) *Attorney, Agent, or Firm* — Intellectual Property Law Offices of Joel Voelzke, APC (57) ABSTRACT

For decreased pitch and roll stiffness, a ring gimbal suspension for a hard disk drive has torsion arms that extend toward the distal end of the suspension as they extend inward from the gimbal outer arms toward the slider bond pad. The torsion arms connect to the slider bond pad at a location that is distal of the dimple contact point. The electrical circuit traces are generally free of stainless steel except where the circuit traces cross the torsion arms, at which point they are affixed to the torsion arms. The electrical circuit traces can include an outward meander away from the slider bond pad as the traces pass over the torsion arms, for additional reduction in stiffness.

17 Claims, 6 Drawing Sheets

FIG. 1

(PRIOR ART)

SUSPENSION RING GIMBAL HAVING FORWARDLY EXTENDING TORSION ARMS

CROSS-REFERENCE TO RELATED APPLICATIONS

None.

BACKGROUND OF THE INVENTION

1. Field of the Invention

This invention relates to the field of suspensions for disk drives. More particularly, this invention relates to the field of a ring gimbal suspension having low stiffness and low circuit contribution to stiffness.

2. Description of Related Art

Figure 1:
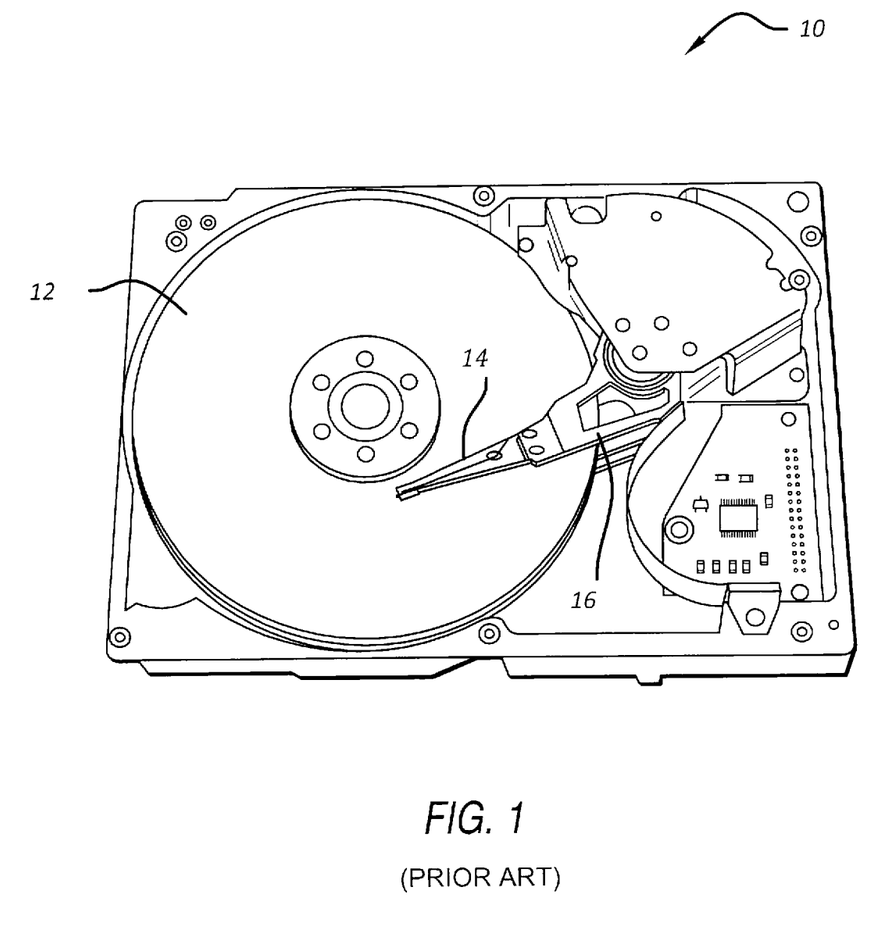
FIG. 1 is generalized perspective view of a disk drive assembly of the prior art.

Magnetic hard disk drives and other types of spinning media drives such as optical disk drives are well known. FIG. 1 illustrates a typical prior art hard disk drive and suspension for which the present invention is applicable. Disk drive unit 10 includes a spinning magnetic disk 12 containing a pattern of magnetic ones and zeroes on it that constitutes the data stored on the disk drive. Disk drive unit 10 further includes a disk drive suspension 14 to which a magnetic head slider (not shown) is mounted. Suspension 14 is coupled to an actuator arm 16, which in turn is coupled to a voice coil motor (not shown) that moves the suspension 14 in order to position it over the correct data track on disk 12. The magnetic head slider is carried on a gimbal which allows the slider to pitch and roll so that the slider follows the data track on the disk, and allows for vibrations of the disk, inertial events such as bumping, and irregularities in the disk's surface.

Various suspension designs have been proposed and used throughout the years. One type of suspension is a ring gimbal suspension. U.S. Patent Publication No. US2009/0268347 by Muraki et al. discloses a ring gimbal design that is intended to produce low pitch and roll stiffness. Generally speaking, low pitch and roll stiffness are desired in a suspension gimbal so that the head slider can pitch and roll as freely as possible as the disk surface spins underneath the slider.

One of the steps in the manufacturing process of a suspension is the pitch static attitude (PSA) adjustment step. The PSA is adjusted by bending plastically deformable part(s) of the suspension so that the pitch and roll angles of the slider, and the gram force with which the slider presses down onto the magnetic disk surface, are correct in the non-spinning state (static state) of the disk drive. The PSA adjustment process can include placing slight, permanent bends in the stainless steel portions of both the suspension spring portion and/or the gimbal.

SUMMARY OF THE INVENTION

The present invention is of a disk drive suspension gimbal design, and more precisely a ring gimbal design, having a low contribution by the electrical circuit to the overall pitch and roll stiffness, and thus a decreased overall gimbal pitch and roll stiffness. At the same time, the gimbal exhibits a sufficient combination of plastic and elastic deformation such that the pitch static attitude (PSA) of the suspension can be adjusted as desired. The invention includes several features that can advantageously be incorporated into the gimbal design either separately or in combination.

In one aspect, the invention is of a ring gimbal suspension in which the points at which the flexible torsion arms of the ring gimbal are connected to the slider bond pad distal of the dimple contact point. In another aspect, the invention is of a ring gimbal suspension whose torsion arms extend distally as they extend inward, and connect to the slider bond pad at points which are distal of the dimple contact point. In another aspect, the invention is of a ring gimbal suspension having electrical circuit traces that generally comprise an insulator and copper signal traces unsupported by a metal support layer such as stainless steel other than where the circuit traces cross underneath the torsion arms, at which point the circuit traces are bonded to the torsion arms. In yet another aspect, the invention is of a ring gimbal suspension in which the electrical circuit traces meander away from the slider in a generally semicircular arc as the circuit traces cross the torsion arms.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

FIG. 1 is generalized perspective view of a disk drive assembly of the prior art. The present invention can be used in such a disk drive assembly.

Figure 2:
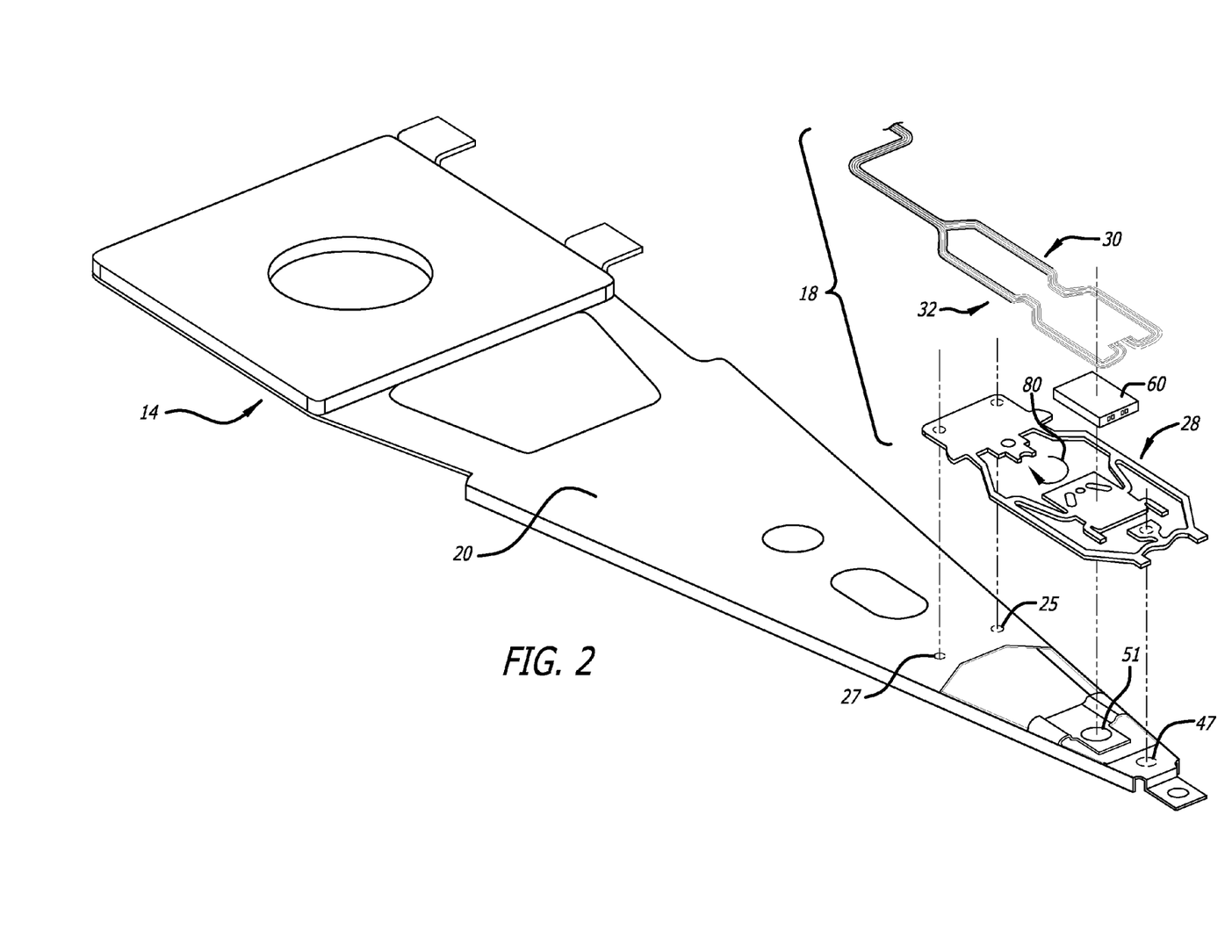
FIG. 2 is an exploded bottom perspective view of a suspension having a ring gimbal according to a first embodiment of the present invention.

FIG. 2 is an exploded bottom perspective view of a suspension having a ring gimbal according to a first embodiment of the present invention. Suspension 14 includes load beam 20, a flexure 18 affixed to the load beam, and a magnetic read/write head slider 60. Flexure 18 includes ring gimbal 28, and right side circuit trace 30 and left side circuit trace 32. The terms "right" and "left" as used herein will refer to the left and right side of the suspension when looking from the top and from the base or proximal end of the suspension toward the distal end of the suspension. Load beam 20 includes a dimple 51 and weld points 25, 27, and 47 at which ring gimbal 28 will be welded thereto. Ring gimbal 28 includes a ring structure formed by the periphery of the gimbal, the ring being generally indicated by ring shape 80 as shown. Dimple 51 defines a pivot contact point about which slider 60, mounted to ring gimbal 28, is free to pivot. Slider 60 includes magnetic read and write transducers (not shown separately) which allow the disk drive circuitry to write data to the surface of the magnetic disk 12 and to read data from the surface of magnetic disk 12. Electrical traces 30 and 32 carry electrical signals between the slider 60 and the circuit components which generate the write signals and read the read signals.

Figure 3:
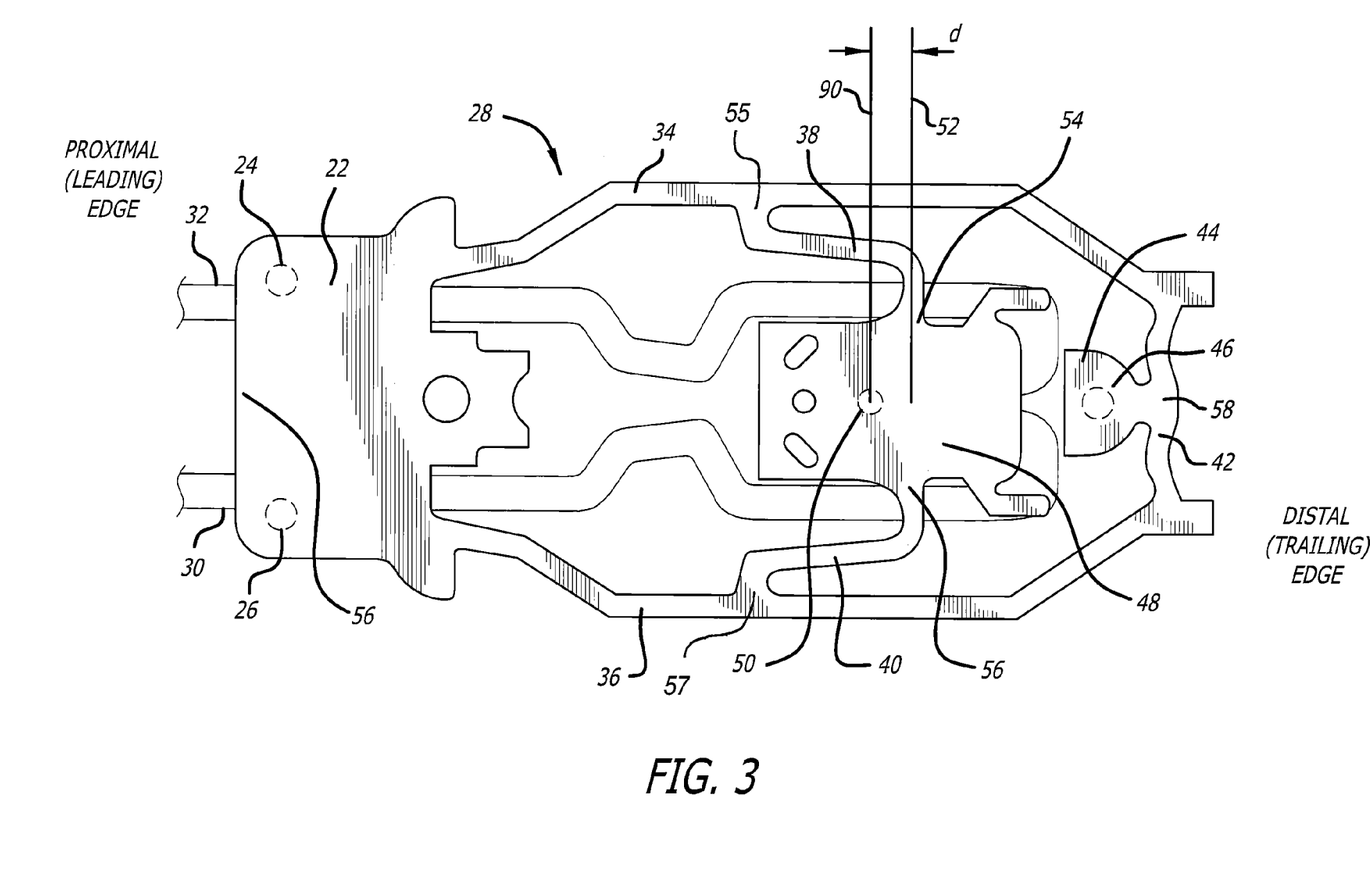
FIG. 3 is a top plan view of the ring gimbal 28 of the suspension of FIG. 2.

FIG. 3 is a top plan view of flexure 18 of FIG. 2. The flexure includes proximal end 22 of the flexure, the ring gimbal 28 itself, and electrical circuit traces 30 and 32. Ring gimbal 28 includes a ring gimbal periphery that includes generally longitudinally extending left side outer arm 34 and right side outer arm 36, and a generally laterally extending lateral cross bar 42 that extends between and mechanically connects together the two outer arms 34 and 36. The flexure has a proximal (leading) end 22 and a distal (trailing) end or edge 58. The terms "leading end" and "trailing end" refer to the usual direction of travel of magnetic media underneath the slider. In the figure as shown, the magnetic media travels from left to right. i.e., from the proximal end to the distal end of the suspension. As used herein, the term "proximal of" or "proximal to," and "distal of" or "distal to," when used in a comparative context means closer to the proximal (leading) edge and closer to the distal (trailing edge), respectively, as shown in FIG. 3. At proximal end 22 of the flexure, the flexure is welded to the load beam at weld point 24 on the flexure which corresponds to, and is welded to, weld point 27 on the load beam. Weld point 26 on the flexure corresponds to, and is welded to, weld point 25 on the load beam.

Ring gimbal 28 further includes right side flexible torsion arm 40 which connects to right side outer arm 36, and left side flexible torsion arm 38 which connects to left side outer arm 34. Torsion arms 38 and 40 are generally S-shaped for flexibility. Left side electrical circuit trace 32 crosses underneath left side torsion arm 38, and right side electrical circuit trace 30 crosses underneath right side torsion arm 40. Torsion arms 38 and 40 connect to gimbal tongue 48 at connection points 54 and 56, respectively, between the torsion arms, to flexibly support gimbal tongue 48 therebetween. Dimple contact point 50 on gimbal tongue 48 is the point at which gimbal tongue 48 underneath dimple 51 contacts, and pivots on, load beam dimple 51. An attachment tab 44 extends from lateral crossbar 42 near distal end 58. Weld point 46 on attachment tab 44 corresponds to, and is welded to, bond pad 47 of load beam 20 to provide forward (distal) support for the ring gimbal. Weld point 46 therefore defines a distal weld point. Ring gimbal 28 including its components proximal end 22, outer arms 34 and 36, torsion arms 38 and 40, lateral crossbar 42, attachment tab 44, and gimbal tongue 48, are typically formed from a unitary sheet of stainless steel. The purpose of ring gimbal 28 is to allow gimbal tongue 48 to float relatively freely with very little pitch and roll resistance, so that slider 60 can freely follow the contours of the surface of data storage disk 12. In order for ring gimbal 28 to float freely, the contribution to the overall gimbal stiffness of both the ring gimbal itself as well as the electrical circuit traces 30 and 32 should be minimized. At the same time, it is difficult to perform pitch static attitude (PSA) adjustment adequately on a gimbal that has no rigidity whatsoever.

The inventors of the present invention have discovered that a ring gimbal and flexure constructed according to the invention provides very low circuit contribution to overall gimbal stiffness, and yet provides sufficient rigidity to allow PSA adjustment to be performed satisfactorily. According to one aspect of the invention, the connection loci 54 and 56 at which torsion arms 38 and 40, respectively, connect to slider bond pad 48, define a line 52 that lies distal of a line 90 that extends laterally from dimple contact point 50. In other words, the points at which the torsion arms connect to the slider bond pad are located distal of the dimple contact point. Connection loci 54, 56 are located a distance d distal of line 90. In a preferred embodiment, d is greater than 0.1 mm, and more preferably, between 0.1 and 0.2 mm.

At the same time, torsion bars 38 and 40 are connected to their respective outer arms 34 and 36 at outer arm connection points 55 and 57 that are proximal of gimbal tongue 48. That is, the outer arm connection points are proximal of the proximal most extent of gimbal tongue 48 and slider 60. As torsion arms 38 and 40 extend laterally inward and toward gimbal tongue 48, the torsion arms also extend longitudinally in a distal direction. Although torsion arms 38 and 40 could have serpentine shapes such that they meander in both a distal direction and a proximal direction as they extend inward, torsion arms 38 and 40 extend longitudinally in a net distal direction as they extend inward.

As another feature of the invention, because distal weld point 46 is located proximal of lateral crossbar 42, making the periphery of ring gimbal 28 to lie outside of distal weld point 46, the periphery of ring gimbal 28 can be made larger without making it wider, thus providing additional flexibility (reduced stiffness) to the ring gimbal.

Figures 4, 5:
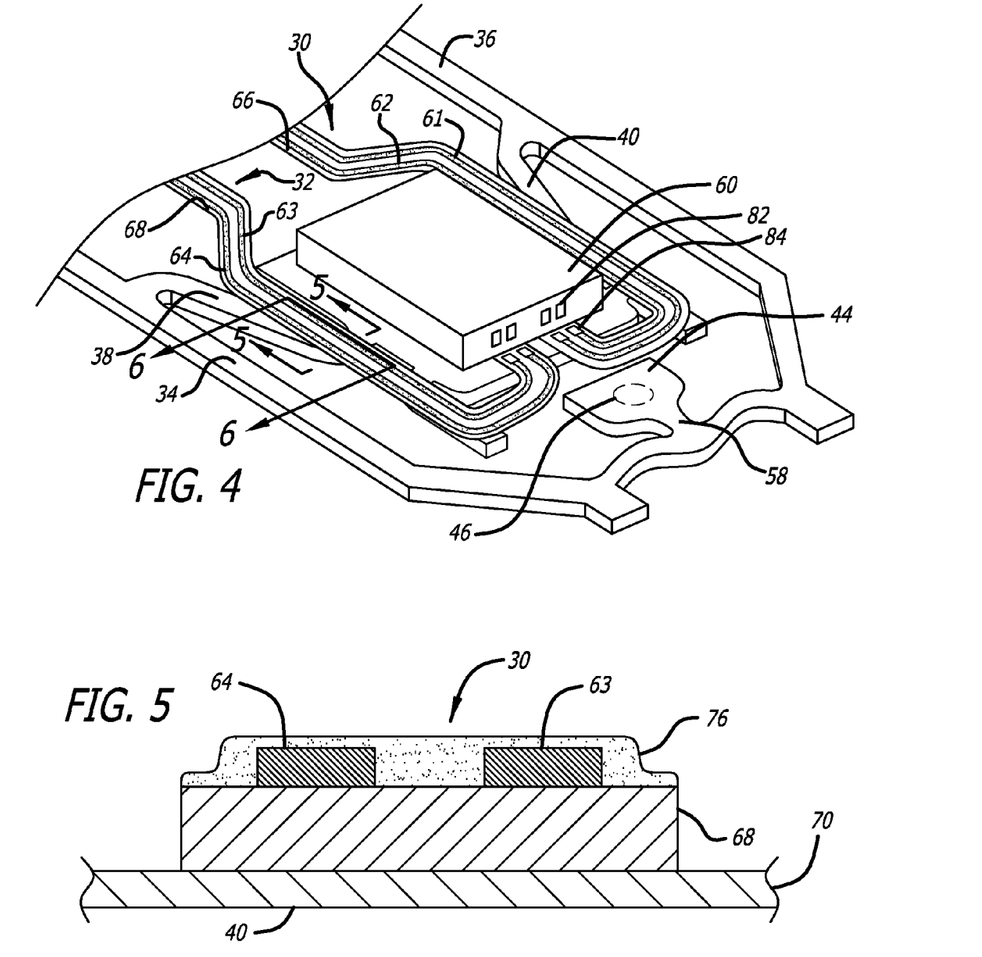
FIG. 4 is bottom perspective view of the ring gimbal 28 of the suspension of FIG. 2.
FIG. 5 is a cutaway side elevation view of electrical circuit trace 30 and torsion arm 40 taken along section line 5-5 in FIG. 4.

FIG. 4 is bottom perspective view of the ring gimbal 28 of the suspension of FIG. 2. The figure shows additional detail regarding left and right side circuit traces 30 and 32, respectively, and how the circuit traces are connected to slider 60. Left side circuit trace 30 typically includes a plurality of individual copper or copper alloy conductors 61, 62, carried on a layer of insulator or dielectric 66 which is typically an organic polymer such as polyimide. Similarly, right side circuit trace 32 typically includes a plurality of individual copper or copper alloy conductors 63, 64, carried on a layer of insulator or dielectric 68. The individual signal conductors 61-64 terminate at the slider side at respective bond pads 84. Slider 60 has a corresponding plurality of bond pads 82. Typically the bond pads 82 and 84 are electrically connected by solder ball bonding in which individual solder balls are formed on bond pads 82 or bond pads 84, then heated to the solder's melting temperature and made to flow until each solder ball flows to form an electrical connection between circuit trace bond pad 84 and its corresponding slider bond pad 82. The solder balls or other electrical connections between circuit bond pads 84 and slider bond pads 82 have been omitted for clarity of illustration. Other types of electrical connection are possible, as will be known to someone skilled in the relevant art, and the actual electrical connection technique between slider 60 and electrical circuit traces 30 and 32 is not considered important to the invention.

FIG. 5 is a cutaway side elevation view of electrical circuit trace 30 and torsion arm 40 taken along section line 5-5 in FIG. 4. Electrical circuit trace 30 includes: a supporting layer 70 which is typically stainless steel, an insulating or dielectric layer 68 thereon; conductive traces 63 and 64 thereon which are typically copper or copper alloy; and finally a protective cover layer 76. Where electrical circuit trace 30 does not cross torsion arm 40, or any other portion of the gimbal such as the two horn-like structures projecting from slider bond pad 48 and shown most clearly in FIG. 3, the electrical circuit trace does not include any stainless steel 70. Stainless steel 70 is typically the same stainless steel sheet from which the rest of ring gimbal 28 is etched.

Figure 6:
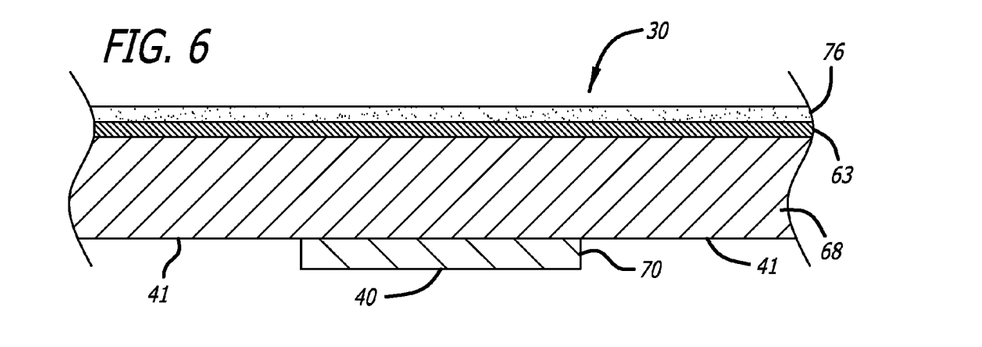
FIG. 6 is a cutaway side elevation view of electrical circuit trace 30 and torsion arm 40 taken along section line 6-6 in FIG. 4.

FIG. 6 is a cutaway side elevation view of electrical circuit trace 30 and torsion arm 40 taken along section line 6-6 in FIG. 4. Torsion arm 40 made of stainless steel 70 provides support for dielectric layer 68. Dielectric layer 68, usually an organic polymer such as polyimide, is affixed to torsion arm 40, usually as a result of whatever process was used to manufacture the suspension. In an additive suspension manufacturing process, which is well known, the copper is selectively deposited on polyimide only in those areas where copper is desired. In a subtractive suspension manufacturing process, which is also well known, the polyimide and copper are laminated over the stainless steel to form a flat laminate sheet of stainless steel/polyimide/copper, and then the various layers of the laminate material are selectively etched away to leave only the desired suspension. Whatever manufacturing process is used, copper or copper alloy signal traces 63 on dielectric layer 68 are covered by cover coat 76 for protection. Areas 41 of circuit trace 30 that are adjacent torsion arm 40 on either longitudinal side thereof, are free of, and therefore not supported by, stainless steel layer 70. In the embodiment shown, stainless steel-free areas 41 are immediately adjacent torsion arm 40. Alternatively, a small amount of stainless steel could extend from torsion arm 40 along electrical circuit trace 30 toward either the left and/or right side of the figure in order to give the electrical circuit trace 30 a little bit more rigidity so that the PSA will hold better. In a preferred embodiment, the total width of stainless steel 70 would not be more than about three times the width of torsion arm 40.

Figure 8:
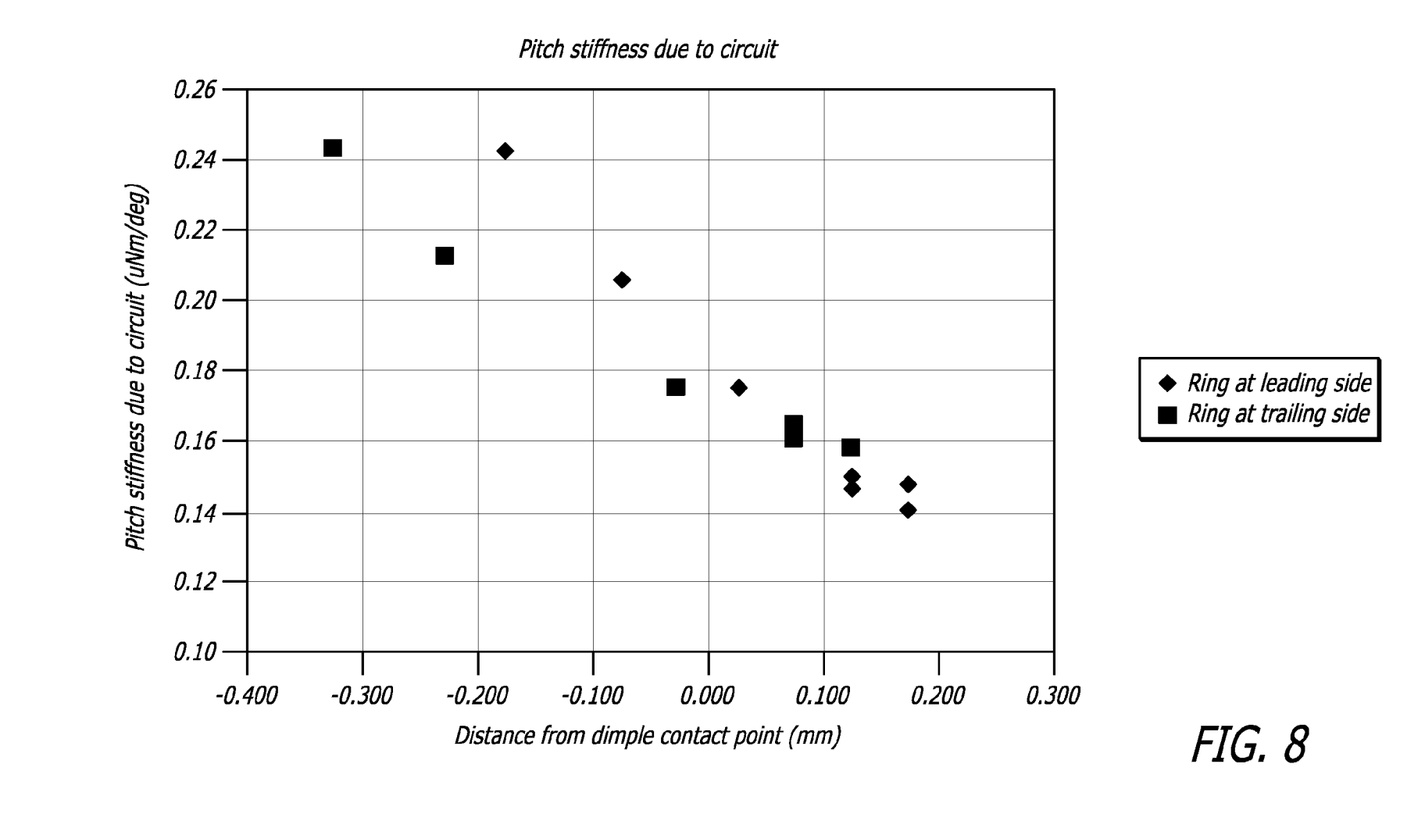
FIG. 8 is a graph of circuit stiffness contribution to overall gimbal pitch stiffness as a function of the distance from the point at which the torsion arms connect to the slider bond pad, to the dimple contact point, according to a simulation of the suspension of FIG. 2.

FIG. 8 is a graph of circuit stiffness contribution to overall gimbal pitch stiffness as a function of the distance from the point at which the torsion arms connect to the slider bond pad, to the dimple contact point, according to a simulation, of the suspension of FIG. 2. The simulation data points labeled "Ring at trailing side" represent simulation data points for suspensions of a previous design in which the torsion arms connect to the outer arms at points that are distal of the points at which those torsion arms connect to the gimbal tongue. In other words, in that prior design the torsion arms extend toward the leading edge as they extend inward. This is in contrast to the present invention in which the torsion arms extend toward the trailing edge as they extend inward, i.e., the ring shape 80 is located at the leading edge instead of the trailing edge. As one can see from the simulation, the lowest pitch stiffness due to the stiffness of the electrical circuit trace was achieved with the ring at the trailing side, and the distance from which the point at which the torsion arms connect to the gimbal tongue is greater than 0.1 mm, and more preferably still between 0.1 mm and 0.2 mm.

Figure 7:
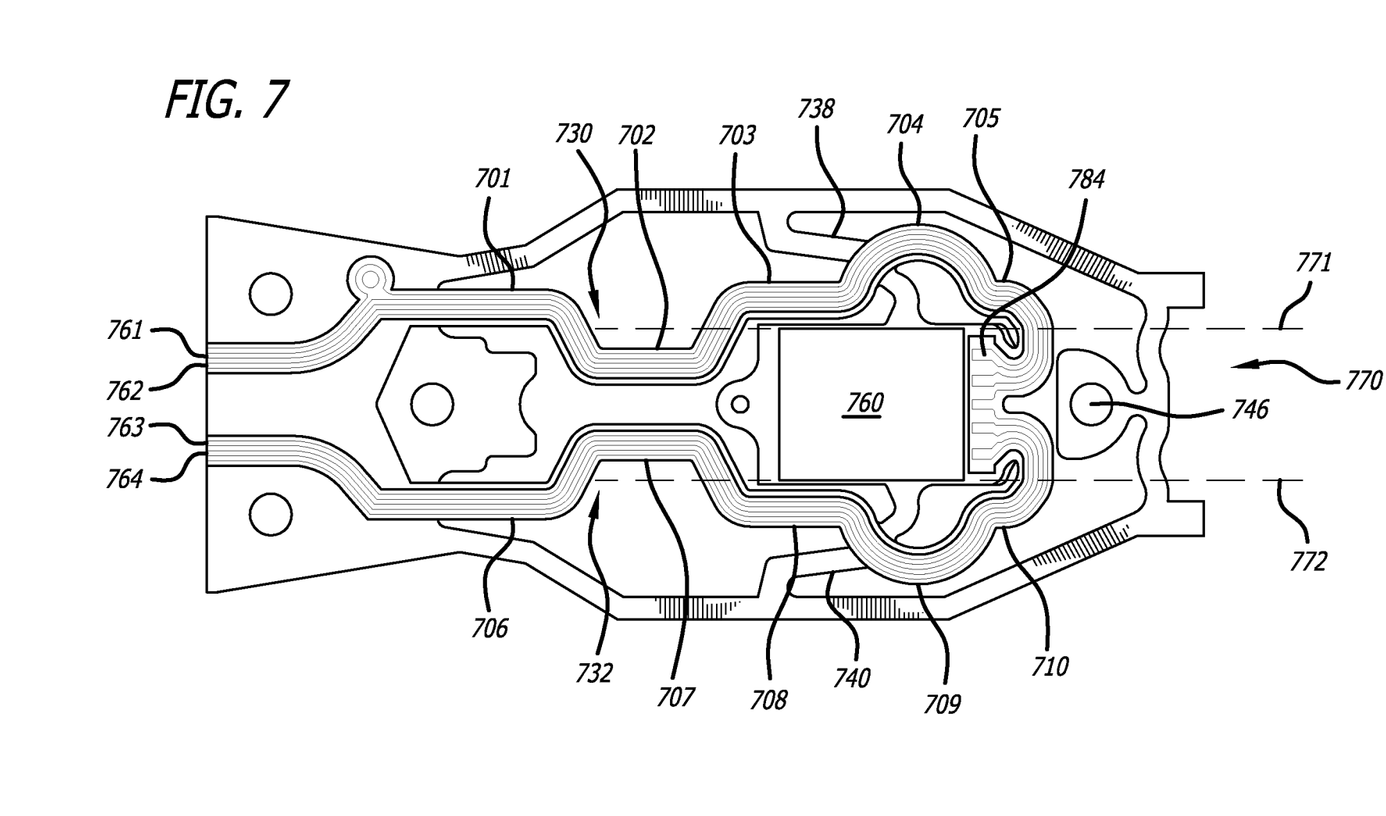
FIG. 7 is a bottom plan elevation view of a ring gimbal and circuit trace according to a further embodiment of the invention.

FIG. 7 is a bottom plan elevation view of a ring gimbal and circuit trace according to a further embodiment of the invention including electrical circuit trace meanders for additional pitch and roll flexibility. As with the previous embodiment, electrical circuit trace 730 includes individual signal conductors 761 and 762, and electrical circuit trace 732 includes individual signal conductors 763 and 764. Torsion arms 738 and 740 support the gimbal tongue to which slider 760 is bonded. The ring gimbal is welded to the load beam at distal weld point 746. The individual signal conductors 761, 762, 763, 764 terminate at respective bond pads 784 for electrically bonding to corresponding bond pads on slider 760. This embodiment differs from the previous embodiment in the aspect that the electrical circuit traces 730 and 732 include inward and outward meanders for additional pitch and roll flexibility. More specifically, generally longitudinally extending electrical circuit trace 730 extends from a location that is proximal of slider 760 to a location that is distal of slider 760, and includes a first portion 701, a second portion defining an inward meander 702, a third portion 703, a fourth portion defining an outward meander 704 in a direction away from the slider as electrical circuit trace 730 crosses torsion arm 738, and a fifth portion 705. Each of portions 701, 703, and 705 are generally collinear, and are located in an area that is laterally outward of a lateral extent of slider 760. In this embodiment, outward meander 704 has a generally semicircular shape as it crosses torsion arm 738. Inward meander 702 constitutes a meander inward toward the longitudinal axis of the suspension. Inward meander 702 lies at least partially within a space defined by a longitudinal projection of the slider, the longitudinal projection of the slider being defined as the volume 770 between the two vertically extending planes 771 and 772 abutting the left side lateral edge of slider 760 and abutting the right side lateral edge of the slider 760, respectively. In other words, the inward meander 702 has at least a portion therefore that lies within an area that is laterally inward of lateral extents of slider 760. In the embodiment shown, inward meander 702 includes a portion thereof that lies entirely within a longitudinal projection of the slider.

Similarly, on the other side of the suspension, generally longitudinally extending electrical circuit trace 732 extends from a location that is proximal of slider 760 to a location that is distal of slider 760, and includes a first portion 706, a second portion defining an inward meander 707, a third portion 708, a fourth portion defining an outward meander 709 in a direction away from the slider as electrical circuit trace 732 crosses torsion arm 740, and a fifth portion 710. Each of portions 706, 708, and 710 are generally collinear, and are located in an area that is laterally outward of a lateral extent of slider 760. In this embodiment, outward meander 709 has a generally semicircular shape as it crosses torsion arm 740. Inward meander 707 constitutes a meander inward toward the longitudinal axis of the suspension. Inward meander 707 lies at least partially within a space defined by a longitudinal projection of the slides. In the embodiment shown, inward meander 707 includes a portion thereof that lies entirely within a longitudinal projection of the slider, the longitudinal projection of the slider being defined as the volume between the two vertically extending planes 771 and 772 abutting the left side lateral edge of slider 760 and abutting the right side lateral edge of the slider 760, respectively.

The inward and outward meanders provide additional flexibility to the flexure. The outward meanders 704 and 709 move the points at which the electrical circuit traces 730 and 732 are affixed to the torsion arms 738 and 740, respectively, to farther away from the gimbal tongue. That means that slider 760 will be less constrained by the affixing of the electrical circuit traces 730 and 732 to torsion arms 738 and 740. That will give slider 760 greater pitch and roll flexibility, which is the desired result. Additionally, inward meanders 702 and 707 provide additional slack for electrical circuit traces 730 and 732 as slider 760 pitches and rolls, meaning again that slider 760 will have greater pitch and roll flexibility.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," "underneath," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A suspension for a hard disk drive, the suspension including:
   a load beam having a dimple therein;
   a flexure affixed to the load beam, the flexure including a ring gimbal supporting a slider, wherein the ring gimbal comprises:
      a pair of outer arms extending in a generally longitudinal direction;
      a slider bond pad disposed between said outer arms, the slider bond pad being located underneath the load beam dimple, a point of contact between the load beam dimple and the slider bond pad defining a dimple contact point;
      a pair of flexible torsion arms, each torsion arm extending from a respective one of said outer arms to the slider bond pad on respective lateral sides thereof to support the slider bond pad;
      an attachment tab disposed distal of the slider bond pad and connected to the outer arms, the attachment tab being affixed to the load beam to provide forward support for the ring gimbal; and
      electrical circuit traces extending on either side of the slider bond pad for carrying electrical signals to and from the slider, the electrical circuit traces comprising an insulating layer, copper signal conductors thereon, and a protective cover layer thereon;
   wherein:
      the torsion arms are attached to the slider bond pad at respective slider bond pad connection points, the slider bond pad connection points being located distal of the dimple contact point; and
      the electrical circuit traces are affixed to the torsion arms at points where the electrical circuit traces pass underneath the torsion arms, and the electrical circuit traces have stainless steel sections attached thereto in areas adjacent the torsion arms, the stainless steel sections being no longer than approximately three times a width of each respectively adjacent torsion arm, the electrical circuit traces being otherwise unsupported by stainless steel in areas adjacent the torsion arms on either longitudinal side thereof.

2. The suspension of claim 1 wherein the torsion arms are attached to the outer arms at respective outer arm connection points, the outer arm connection points being located proximal of the slider bond pad connection points such that as the torsion arms extend laterally inward toward the slider bond pad, the torsion arms also extend longitudinally in a distal direction.

3. The suspension of claim 2 wherein as the torsion arms extend laterally inward toward the slider bond pad, the torsion arms also extend longitudinally in a net distal direction.

4. The suspension of claim 1 wherein the slider bond pad connection points are located a distance of greater than 0.1 mm distal of the dimple contact point.

5. The suspension of claim 1 wherein lengths of the stainless steel sections are equal to the widths of the torsion arms, such that the electrical circuit traces are unsupported by stainless steel in areas adjacent the torsion arms on either longitudinal side thereof.

6. The suspension of claim 1
   wherein the electrical circuit traces define generally semi-circular arcs as they cross underneath the torsion arms.

7. The suspension of claim 6, wherein the electrical circuit traces each include an inward meander toward a longitudinal axis of the suspension, each of the inward meanders having a portion thereof that lies within an area that is laterally inward of lateral extents of the slider.

8. A suspension for a hard disk drive, the suspension including:
   a load beam having a dimple therein;
   a flexure affixed to the load beam, the flexure including a ring gimbal supporting a slider, wherein the ring gimbal comprises:
      a pair of outer arms extending in a generally longitudinal direction;
      a slider bond pad disposed between said outer arms, the slider bond pad being located underneath the load beam dimple, a point of contact between the load beam dimple and the slider bond pad defining a dimple contact point; and
      a pair of flexible torsion arms, each torsion arm extending from a respective one of said outer arms to said slider bond pad on respective lateral sides thereof, the flexible torsion arms connecting to the slider bond pad at respective slider bond pad connection points;
   a crossbar connected to each of the outer arms;
   an attachment tab connected to the crossbar, the attachment tab being welded for support at a weld point that defines a distal weld point;
   wherein:
      the torsion arms are attached to the outer arms at respective outer arm connection points, the outer arm connection points being located proximal of the slider bond pad connection points such that as the torsion arms extend laterally inward toward the slider bond pad, the torsion arms also extend longitudinally in a distal direction; and
      the distal weld point is located distal of the slider bond pad and proximal to the crossbar.

9. The suspension of claim 8 wherein the torsion arms are attached to the slider bond pad at respective slider bond pad connection points, the slider bond pad connection points being distal of the dimple contact point.

10. The suspension of claim 9 wherein the slider bond pad connection points are located a distance of greater than 0.1 mm distal of the dimple contact point.

11. The suspension of claim 8 wherein each of the torsion arms is generally S-shaped.

12. The suspension of claim 8 wherein each of the torsion arms is connected to its respective outer arm at a point that lies proximal of a proximal most extent of the slider, and is connected to the slider bond pad at a point that is distal of the dimple contact point.

13. A suspension for a hard disk drive, the suspension including:
   a load beam having a dimple therein;

a flexure affixed to the load beam, the flexure including a ring gimbal supporting a slider, wherein the ring gimbal comprises:
  a pair of outer arms extending in a generally longitudinal direction;
  a slider bond pad disposed between said outer arms, the slider bond pad being located underneath the load beam dimple, a point of contact between the load beam dimple and the slider bond pad defining a dimple contact point;
  a pair of flexible torsion arms, each torsion arm extending from a respective one of said outer arms to the slider bond pad on respective lateral sides thereof to support the slider bond pad;
  a lateral crossbar connected to each of the outer arms; and
  an attachment tab disposed distal of the slider bond pad and connected to the lateral crossbar, the attachment tab being welded to the load beam to provide forward support for the ring gimbal at a weld point that defines a distal weld point;
wherein:
  the torsion arms are attached to the slider bond pad at respective slider bond pad connection points, the slider bond pad connection points being located distal of the dimple contact point; and
  the distal weld point is located distal of the slider and proximal to the lateral crossbar.

14. The suspension of claim 13 further comprising electrical circuit traces for carrying electrical signals to and from the slider, the electrical circuit traces including outwardly directed arcs as the circuit traces cross respective ones of the torsion arms.

15. The suspension of claim 14 wherein the electrical circuit traces are affixed to the torsion arms at points where the electrical circuit traces pass underneath the torsion arms, and the electrical circuit traces have stainless steel sections attached thereto in areas adjacent the torsion arms, the stainless steel sections being no longer than approximately three times a width of each respectively adjacent torsion arm, the electrical circuit traces being otherwise unsupported by stainless steel in areas adjacent the torsion arms on either longitudinal side thereof.

16. The suspension of claim 15 wherein the lengths of the stainless steel sections are equal to the widths of the torsion arms, such that the electrical circuit traces are unsupported by stainless steel in areas adjacent the torsion arms on either longitudinal side thereof.

17. The suspension of claim 14 wherein the outer arms are connected to the slider bond pad by generally S-shaped torsion arms extending therebetween, the torsion arms being connected to the slider bond pad at respective slider bond pad connection points, the slider bond pad connection points being located distal of a dimple on the load beam about which the slider pivots.

* * * * *